United States Patent
Tuli

(10) Patent No.: US 9,362,773 B2
(45) Date of Patent: Jun. 7, 2016

(54) METHOD AND APPARATUS FOR DETERMINATION OF A NON-CHARGING OPERATION

(71) Applicant: Nokia Corporation, Espoo (FI)

(72) Inventor: Apaar Tuli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 490 days.

(21) Appl. No.: 13/930,467

(22) Filed: Jun. 28, 2013

(65) Prior Publication Data

US 2015/0002075 A1    Jan. 1, 2015

(51) Int. Cl.
*G06N 5/02* (2006.01)
*G06F 1/16* (2006.01)
*H02J 7/00* (2006.01)

(52) U.S. Cl.
CPC .............. *H02J 7/007* (2013.01); *G06F 1/1632* (2013.01); *G06N 5/02* (2013.01); *H02J 7/0052* (2013.01); *H02J 2007/0001* (2013.01)

(58) Field of Classification Search
None
See application file for complete search history.

(56) References Cited

U.S. PATENT DOCUMENTS

| | | | |
|---|---|---|---|
| 2010/0131691 A1 | 5/2010 | Chatterjee et al. | |
| 2011/0309789 A1 | 12/2011 | Prasad | |
| 2012/0115433 A1* | 5/2012 | Young | H04L 41/5029 455/406 |
| 2012/0268238 A1* | 10/2012 | Park | G07F 15/006 340/5.8 |
| 2013/0002191 A1* | 1/2013 | Jung | H02J 7/025 320/103 |
| 2013/0198551 A1* | 8/2013 | Marlin | B60L 11/1846 713/340 |
| 2014/0046707 A1 | 2/2014 | Hama | |
| 2014/0233432 A1* | 8/2014 | Lim | H04L 63/20 370/259 |
| 2014/0266025 A1* | 9/2014 | Jakubowski | H02J 7/025 320/108 |

FOREIGN PATENT DOCUMENTS

| | | |
|---|---|---|
| WO | 2012140826 A1 | 10/2012 |
| WO | 2012177283 A1 | 12/2012 |

OTHER PUBLICATIONS

Apaar Tuli, "Apparatus and Method for Providing Device Charging Information", U.S. Appl. No. 13/910,618, Jun. 5, 2013, pp. 1-29.
International Search Report and Written Opinion received in Patent Cooperation Treaty Application No. PCT/FI2014/050483, dated Sep. 10, 2014, 12 pages.

\* cited by examiner

*Primary Examiner* — Stanley K Hill
*Assistant Examiner* — Mikayla Chubb
(74) *Attorney, Agent, or Firm* — Banner & Witcoff, Ltd.

(57) ABSTRACT

A method comprising determining that a charge session event associated with a charge session between an apparatus and a separate apparatus has occurred, determining a separate apparatus identity of the separate apparatus, determining a non-charging operation based, at least in part, on the separate apparatus identity and the charge session event, and causing performance of the non-charging operation is disclosed.

20 Claims, 7 Drawing Sheets

METHOD AND APPARATUS FOR DETERMINATION OF A NON-CHARGING OPERATION

TECHNICAL FIELD

The present application relates generally to determination of a non-charging operation.

BACKGROUND

Many users have become dependent on electronic apparatuses to manage various aspects of their lives. For example, many users keep track of many of their appointments, meetings and other events in a calendar program on their electronic apparatus. In addition, many users utilize electronic apparatuses for communication. Furthermore, many users have multiple electronic apparatuses. From time to time, it may be desirable to replenish an electronic apparatus' power source via charging of the electronic apparatus. In certain circumstances, it may be desirable to tie the charging of an electronic apparatus to certain non-charging operations that may relate to sending of a message, sending of a notification, prompting for authorization, and/or the like.

SUMMARY

Various aspects of examples of the invention are set out in the claims.

One or more embodiments may provide an apparatus, a computer readable medium, a non-transitory computer readable medium, a computer program product, and a method for determining that a charge session event associated with a charge session between an apparatus and a separate apparatus has occurred, determining a separate apparatus identity of the separate apparatus, determining a non-charging operation based, at least in part, on the separate apparatus identity and the charge session event, and causing performance of the non-charging operation.

One or more embodiments may provide an apparatus, a computer readable medium, a computer program product, and a non-transitory computer readable medium having means for determining that a charge session event associated with a charge session between an apparatus and a separate apparatus has occurred, means for determining a separate apparatus identity of the separate apparatus, means for determining a non-charging operation based, at least in part, on the separate apparatus identity and the charge session event, and means for causing performance of the non-charging operation.

In at least one example embodiment, the charge session event relates to at least one of a charge session initiation event or a charge session termination event.

In at least one example embodiment, the charge session initiation event relates to establishment of a connection between the apparatus and the separate apparatus.

In at least one example embodiment, the charge session termination event relates to disestablishment of a connection between the apparatus and the separate apparatus.

In at least one example embodiment, the connection relates to communication associated with charging of the separate apparatus by the apparatus.

In at least one example embodiment, the connection relates to at least one of a wireless connection or a wired connection.

In at least one example embodiment, the wireless connection relates to at least one of a wireless charging signal or a wireless communication signal.

In at least one example embodiment, the charge session relates to an interactive session between the apparatus and the separate apparatus associated with performance of a charging operation.

In at least one example embodiment, the separate apparatus identity relates to information that identifies a property of the separate apparatus, a type of the separate apparatus, or a unique identifier of the separate apparatus.

One or more example embodiments further perform performance of a charging operation.

In at least one example embodiment, the non-charging operation relates to an authentication operation, wherein performance of the charging operation is based upon affirmative authentication of the authentication operation.

In at least one example embodiment, affirmative authentication relates to verifying at least one authentication credential.

In at least one example embodiment, the authentication credential comprises at least one of a password, personal identification number, and/or the like.

In at least one example embodiment, a charging operation relates to provision of power from the apparatus to the separate apparatus.

In at least one example embodiment, the charging operation relates to at least one of initiation of provision of power from the apparatus to the separate apparatus, modification of provision of power from the apparatus to the separate apparatus, or termination of provision of power from the apparatus to the separate apparatus.

In at least one example embodiment, the charge session event is independent of a charge event.

In at least one example embodiment, the charge event relates to performance of a charging operation.

In at least one example embodiment, determination of the non-charging operation comprises determining existence of at least one rule associated with the separate apparatus identity and the charge session event, and the non-charging operation is identified by the rule.

In at least one example embodiment, the rule comprises a single performance directive.

One or more example embodiments further perform preclusion of further performance of the non-charging operation based, at least in part, on the rule and the single performance directive.

In at least one example embodiment, the rule comprises information that identifies a rule charge session event and information that identifies a rule apparatus identity.

In at least one example embodiment, the rule charge session event designates a charge session event associated with causation of performance of the rule.

In at least one example embodiment, the rule apparatus identity designates an apparatus identity associated with causation of performance of the rule.

One or more example embodiments further perform receipt of information indicative of the rule from a different separate apparatus.

In at least one example embodiment, the information indicative of the rule comprises information indicative of at least one of a rule apparatus identity or a rule charge session event.

In at least one example embodiment, the different separate apparatus relates to at least one of a rule management server apparatus, a charging apparatus, or a rule management client apparatus.

In at least one example embodiment, determination of existence of the rule comprises selection of at least one rule from a rule list based, at least in part, on correlation between the separate apparatus identity and a rule apparatus identity of the rule and on correlation between the charge session event and an a rule charge session event of the rule.

One or more example embodiments further perform receipt of information indicative of the rule list from a different separate apparatus.

In at least one example embodiment, the information indicative of the rule list comprises information indicative of at least one rule.

In at least one example embodiment, the different separate apparatus relates to at least one of a rule management server apparatus, a charging apparatus, or a rule management client apparatus.

In at least one example embodiment, the rule apparatus identity is comprised by a rule apparatus identity list, and correlation between the rule apparatus identity and the separate apparatus identity relates to determination that the rule apparatus identity corresponds to the separate apparatus identity.

In at least one example embodiment, the rule designates correspondence between any rule apparatus identity of the rule apparatus identity list and the separate apparatus identity as a criteria for performance of the non-charging operation.

In at least one example embodiment, the rule apparatus identity is comprised by a rule apparatus identity list, and correlation between the rule apparatus identity and the separate apparatus identity relates to determination that each rule apparatus identity of the rule apparatus identity list fails to correspond to the separate apparatus identity.

In at least one example embodiment, the non-charging operation relates to an authentication operation.

In at least one example embodiment, the rule designates lack of correspondence between any rule apparatus identity of the rule apparatus identity list and the separate apparatus identity as a criteria for performance of the non-charging operation.

In at least one example embodiment, the rule apparatus identity list is associated with the rule.

In at least one example embodiment, determination of the separate apparatus identity comprises receipt of information indicative of a separate apparatus identity of the separate apparatus.

In at least one example embodiment, determination of the separate apparatus identity comprises determination of lack of recognition of information indicative of the separate apparatus identity of the separate apparatus.

In at least one example embodiment, determination of lack of recognition of information indicative of the separate apparatus identity comprises determination of lack of receipt of information indicative of the separate apparatus identity.

In at least one example embodiment, the non-charging operation relates to causing sending of at least one of a message or a notification.

In at least one example embodiment, the message relates to predetermined information.

In at least one example embodiment, the predetermined information is designated by a rule.

In at least one example embodiment, the notification relates to information indicative of at least one of the non-charging operation, the charge session event, the charge session, or the separate apparatus identity.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
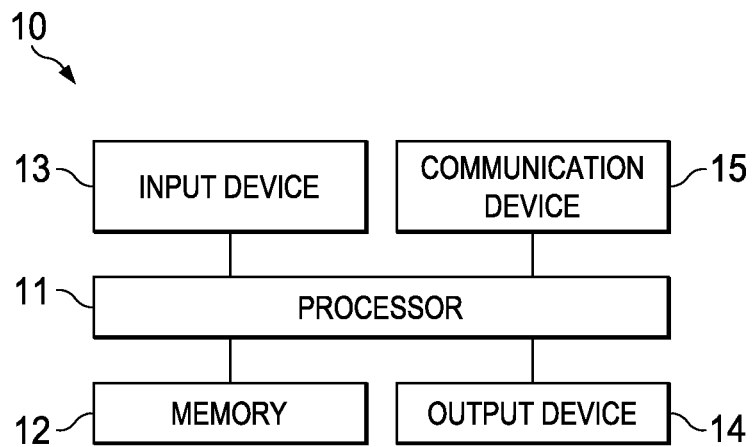
FIG. 1 is a block diagram showing an apparatus according to an example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
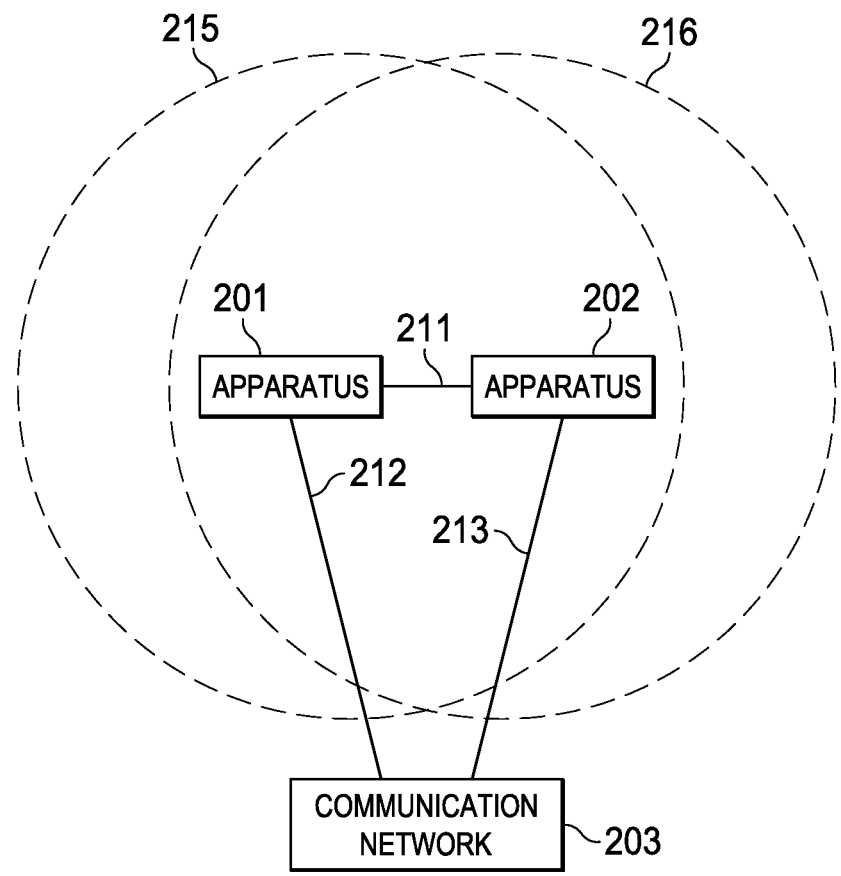
FIG. 2 is a block diagram illustrating apparatus communication according to at least one example embodiment.

FIG. 2 is a block diagram illustrating apparatus communication according to at least one example embodiment. The example of FIG. 2 is merely an example of apparatus communication, and does not limit the scope of the claims. For example, proximity of the apparatuses may vary, type of communication may vary, communication path between apparatuses may vary, and/or the like.

As electronic apparatuses have become more prolific, there has been an increasing desire for users to utilize multiple electronic apparatuses collaboratively. For example, a user may have a plurality of electronic apparatuses. In such an example, the user may desire to charge an apparatus after extended use. The user may further desire the ability to tie a charging operation to certain non-charging operations, such as the sending of a notification to another apparatus upon termination of a charge session, the leaving of a message for a different apparatus upon initiation of a charge session, the ability to restrict charging to certain predetermined apparatuses, and/or the like. For example, the user may wish to be messaged on the user's apparatus when another apparatus initiates a charge session with a charger apparatus. In such an example, the other apparatus may be the user's apparatus or a different user's apparatus. In such an example, the message may be sent to the user's apparatus or to a plurality of apparatuses, and may be sent upon charge session initiation, charge session termination, or at any other time associated with such a charge session. Additionally, for example, the user may desire to leave a message for a different apparatus that is sent to the different apparatus when such a different apparatus is placed on a specific charger apparatus or one of a predetermined set of charger apparatuses. In this example, the user may desire the ability to leave a contextual message for a different user, such message appearing on the different user's apparatus upon charge session initiation, charge session termination, and/or the like.

In some circumstances, a user may desire to have collaboration between apparatuses, such as between an apparatus and a charger apparatus, based on their proximity with each other. For example, it may be intuitive for a user to manage collaboration between apparatuses that are local to each other. A plurality of apparatuses may be proximate to each other based on location, availability of local communication among the apparatuses, and/or the like. For example, if the apparatuses collaborate by way of near field communication, inductive communication, electric field communication, Bluetooth, infrared, local area network, wireless local area network, and/or the like, the apparatuses may be considered to be proximate with each other based, at least in part, on availability of such proximity-based communication with each other. In some circumstances, a user may desire to utilize multiple apparatuses. In at least one example embodiment, apparatuses include electronic apparatuses, charger apparatuses, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform.

In at least one example embodiment, communication based, at least in part, on short range communication is referred to as proximity-based-communication. In at least one example embodiment, proximity-based communication relates to wireless communication that is associated with a short range, such as near field communication, inductive communication, electric field communication, Bluetooth, infrared, local area network, wireless local area network, and/or the like. In such an example, the exchange of information may be by way of the short range wireless communication between the apparatus and the other apparatus.

In some circumstances, proximity-based communication may relate to communication between apparatuses using a short range communication channel. In some circumstances, proximity-based communication may relate to communication between apparatuses using a communication channel that is not necessarily a short range communication channel. In such circumstances, the utilization of the communication channel may be predicated upon availability of a short range communication channel. For example, an apparatus may utilize a short range communication channel to obtain information associated with communication across a different communication channel. For example, an apparatus may utilize short range communication with another apparatus to obtain address information for the other apparatus. In such an example, the apparatus may utilize the address information to communicate with the other apparatus by way of a different communication channel, such as a different short range communication channel, a communication channel that is not a short range communication channel, and/or the like. In at least one example embodiment, a communication channel relates to, at least partial, allocation of communication resources between an apparatus and another apparatus. For example, a communication channel may relate to a frequency designation, a channel designation, a sub-channel designation, a frame designation, and/or the like. An apparatus may have a plurality of communication channels. For example, an apparatus may have one or more communication channels with one or more other apparatuses, with one or more communication networks, and/or the like. For purposes of clarity, a communication channel may be referred to in terms of an apparatus involved in the communication channel. For example, a communication channel associated with an apparatus may be referred to as an apparatus communication channel, a communication channel associated with a separate apparatus may be referred to as a separate apparatus communication channel, a communication channel associated with a communication network may be referred to as a communication network communication channel, and/or the like.

In at least one example embodiment, an apparatus may be involved in establishment of a communication channel. For example, there may be various actions that an apparatus may take for a communication channel to become existent between the apparatus and another apparatus, a communication network, and/or the like. After a communication channel is established, the communication channel may be utilized for communication. In at least one example embodiment, an apparatus may be involved in termination of a communication channel. For example, there may be various actions that an apparatus may take for a communication channel to become non-existent between the apparatus and another apparatus, a communication network, and/or the like. After a communication channel is terminated, the communication channel may be unavailable for communication. In at least one example embodiment, existence of a communication channel between an apparatus and another apparatus is indicative of the apparatus being in communication with the other apparatus.

In at least one example embodiment, an apparatus receives an indication of availability of proximity-based communication with a separate apparatus. The indication of availability may relate to information indicating that the other apparatus is within range of a short range communication, an indication that the other apparatus is present on a short range communication network, and/or the like. In at least one example embodiment, the apparatus determines that the other apparatus is unavailable for proximity-based communication by way of absence of information indicative of availability of the proximity-based communication.

In the example of FIG. 2, apparatus 201 and apparatus 202 may collaborate locally. In some circumstances, apparatus 201 and apparatus 202 may communicate directly with each other, such as by way of proximity-based communication, by way of communication channel 211. In the example of FIG. 2, the proximity-based communication range of apparatus 201 is indicated by region 215 and the proximity-based communication range of apparatus 202 is indicated by region 216. In some circumstances, apparatus 201 may communicate with apparatus 202 by way of communication network 203. For example, communication network 203 may be an intermediary apparatus such that apparatus 201 and apparatus 202 may communicate with each other by way of communication channels 212 and 213, may be a group of apparatuses in communication with each other such that apparatus 201 and apparatus 202 may communicate with each other by way of communication channels 212 and 213, and/or the like. In some circumstances, apparatus 201 may obtain information from apparatus 202, by way of communication channel 211, which allows apparatus 201 to communicate with apparatus 202 by way of communication network 203.

In at least one example embodiment, a communication network relates to one or more apparatuses that provide for communication between an apparatus and another apparatus. For example, the communication network may comprise a plurality of communication apparatuses. A communication apparatus may be any apparatus associated with facilitation of communication in a communication network. For example, a communication apparatus may relate to an access point for the communication network, such as a wireless access point, a cellular base station, a Bluetooth access point, and/or the like. In another example, a communication network apparatus may relate to an apparatus utilized for communication within the communication network, such as a hub, a router, a switch, and/or the like. In at least one example embodiment, an apparatus may be in communication with a communication network by way of a communication channel with a communication apparatus of the communication network. In at least one example embodiment, an apparatus that does not have a communication channel with a communication apparatus may not be in communication with the communication apparatus. In some circumstances, an apparatus and another apparatus may communicate by way of a communication network by way of the same communication apparatus. For example, an apparatus may communicate with another apparatus, by way of a cellular network, where the apparatus and the other apparatus are in communication with the same base station of the cellular network. In such an example, the apparatus and the other apparatus may be within a region that is covered by the base station.

In at least one example embodiment, an apparatus may utilize a communication network for a message. In at least one example embodiment, a message relates to the sending of a message between an apparatus and another apparatus, such as a text message, an audio message, an email, an instant message, a notification, and/or the like. In at least one example embodiment, a communication network utilizes a message address in association with a message for an apparatus. In at least one example embodiment, the message address relates to an identifier for designating communication information to at least one apparatus in a communication network. For example, the message address may relate to a phone number, a uniform resource locator (URL), international mobile equipment identity (IMEI), an email address, an instant message address, any unique apparatus identifier, and/or the like. In at least one example embodiment, the communication network utilizes an existing communication channel to allow the apparatus to send a message. In at least one example embodiment, an apparatus sends a message by way of the communication channel. An apparatus may engage in messaging by way of transmitting a message, for example sending a message to another apparatus, may engage in messaging by way of receiving a message, for example receiving a message sent from another apparatus, and/or the like. The communication network may route message information to one or more apparatuses based on the message address. For example, a communication network may determine one or more apparatus identifier that is associated with a message address, such as a phone number, a uniform resource locator (URL), international mobile equipment identity (IMEI), an email address, an instant message address, any unique apparatus identifier, and/or the like that is associated with an apparatus, and utilize the apparatus identifier to provide message information to the apparatus. In at least one example embodiment, a message address is associated with an apparatus by way of the apparatus being designated to receive message information based, at least in part, on the message address.

In at least one example embodiment, an apparatus may have more than one message address. For example, the apparatus may be associated with multiple phone numbers, be associated with multiple instant message addresses, be associated with multiple email addresses, be associated with multiple subscriber accounts, be associated with multiple types of messages, be associated with multiple communication networks, and/or the like. For example, an apparatus may be in communication with a cellular network, a wireless local area network, a Bluetooth network, a near field communication network, an inductive communication network, an electronic field communication network, and/or the like. In such an example, there may be a message address associated with a communication network and a different message address associated with a different communication network. In this manner, a communication channel that the apparatus utilizes in communication with such a communication network may be considered to be associated with the message address. For example, the apparatus may have a communication channel that is associated with a message address and a different communication channel that is associated with a different message address. Additionally, for example, the apparatus may have a communication channel that is associated with messaging operations that is the same as a charging channel or that is separate from the charging channel. In this manner, a communication channel may be associated with sending or receiving of a message by way of the associated message address. For example, an apparatus may utilize an apparatus communication channel for messaging by way of a message address, and a different apparatus may utilize a different apparatus communication channel for messaging by way of a message address. In at least one example embodiment, a message relates to a cellular message, and an apparatus communication channel relates to an apparatus cellular communication channel.

In the example of FIG. 2, apparatus 201 may determine that apparatus 202 is proximate based, at least in part, on availability of proximity-based communication 211, by way of communicating with the same communication apparatus of communication network 203, by way of comparing position information of apparatus 201 and position information of apparatus 202, and/or the like.

In some circumstances it may be desirable for an apparatus to identify a separate apparatus. For example, it may be desirable for the apparatus to differentiate between an apparatus and a different apparatus by way of an apparatus identity. In at least one example embodiment, an apparatus identity relates to information indicative of a specific apparatus or type of apparatus. In at least one example embodiment, an apparatus identity is based on, at least in part, a phone number, an international mobile equipment identity (IMEI), a unique apparatus identifier, and/or the like. In one or more example embodiments, it may be useful for an apparatus to identify a separate apparatus. For example, an apparatus may identify a separate apparatus by way of a separate apparatus identity. In order to identify a separate apparatus, it may be desirable for an apparatus to determine a separate apparatus identify. In at least one example embodiment, the apparatus determines a separate apparatus identity of the separate apparatus. For example, the determination of the separate apparatus identity may relate to the receiving of information indicative of a separate apparatus identity from the separate apparatus, the reading of information indicative of a separate apparatus identity stored on the apparatus, and/or the like. In at least one example embodiment, determination of the separate apparatus identity may relate to receipt of information indicative of a separate apparatus identity of the separate apparatus. For example, the apparatus may receive information indicative of a separate apparatus identity of a separate apparatus via a communication channel of a communication network, via a communication channel to the separate apparatus, and/or the like.

In at least one example embodiment, the separate apparatus identity relates to information that identifies a property of the separate apparatus, a type of the separate apparatus, or a unique identifier of the separate apparatus. For example, the property of the separate apparatus may relate to a capability of the separate apparatus, a technical specification of the separate apparatus, a component of the separate apparatus, and/or the like. The type of the separate apparatus, for example, may relate to a physical characteristic of the separate apparatus, a class of separate apparatus, and/or the like. In one or more example embodiments, a unique identifier of the separate apparatus may be based, at least in part, on a phone number, an international mobile equipment identity (IMEI), a unique apparatus identifier, and/or the like.

In certain circumstances, a separate apparatus identity may be unavailable or unknown due to lack of recognition of information indicative of the separate apparatus identity. Although a separate apparatus identity may be unavailable or unknown, it may be desirable to have a separate apparatus identity for such circumstances in order to note such a lack of recognition of information indicative of the separate apparatus identity. For example, an apparatus may not recognize information indicative of a separate apparatus identity. In one or more example embodiments, lack of recognition of information indicative of a separate apparatus identity may relate to the receipt of information in an unknown format, receipt of information that does not correspond to a known identity, and/or the like. In at least one example embodiment, the determination of lack of recognition is based on correspondence between information indicative of a separate apparatus identity and a known separate apparatus identity, a type of separate apparatus identity, a format of information indicative of a separate apparatus identity, and/or the like. In one or more example embodiments, determination of the separate apparatus identity may be based, at least in part, on determination of lack of recognition of information indicative of the separate apparatus identity of the separate apparatus.

In certain circumstances, a separate apparatus identity may be unavailable or unknown due to lack of receipt of information indicative of the separate apparatus identity. Although a separate apparatus identity may be unavailable or unknown, it may be desirable to have a separate apparatus identity for such circumstances in order to note such a lack of receipt of information indicative of the separate apparatus identity. In one or more example embodiments, lack of receipt of information indicative of the separate apparatus identity may relate to a separate apparatus that does not communicate information indicative of the separate apparatus identity, an error in communicating the information indicative of the separate apparatus identity from the separate apparatus to the apparatus, an incompatible separate apparatus communication protocol, and/or the like. In at least one example embodiment, determination of lack of recognition of information indicative of the separate apparatus identity may be based, at least in part, on determination of lack of receipt of information indicative of the separate apparatus identity.

In at least one example embodiment, the apparatus comprises information indicative of the identity of the separate apparatus. For example, the apparatus may comprise information associated with communicating with the separate apparatus. In at least one example embodiment, an apparatus comprises information indicative of a message address of a separate apparatus. For example, the apparatus may store information that corresponds with a message address of the separate apparatus.

In some circumstances it may be desirable for an apparatus to be aware of the occurrence of certain events associated with a separate apparatus. For example, it may be desirable for an apparatus to be aware of a certain events associated with a separate apparatus for purposes that may relate to triggering further events or occurrences. In at least one embodiment, a certain event may relate to a charge session. In at least one embodiment, a charge session relates to an interactive session associated with charging between an apparatus and a separate apparatus. In one or more example embodiments, an apparatus may determine that a charge session event associated with a charge session between the apparatus and a separate apparatus has occurred. For example, an apparatus may relate to a charger apparatus and a separate apparatus may relate to a charging apparatus, and/or the like. In at least one example embodiment, a charger apparatus relates to an apparatus that delivers power to a charging apparatus, and a charging apparatus relates to an apparatus that receives power from the charging apparatus. In at least one example embodiment, a charge session event may relate to a charge session initiation event or a charge session termination event. In one or more example embodiments, a charge session initiation event relates to establishment of a connection between the apparatus and the separate apparatus. For example, establishment of a connection may relate to the creation or setting up of a communication channel between an apparatus and a separate apparatus, initiation of charge session between an apparatus and a separate apparatus, and/or the like. In one or more example embodiments, the charge session termination event may relate to disestablishment of a connection between the apparatus and the separate apparatus. For example, disestablishment of a connection may relate to termination of a communication channel, termination of a charge session, and/or the like. In at least one example embodiment, the connection may relate to a wireless connection, a wired connection, and/or the like. In one or more example embodiments, the wireless connection may relate to a wireless charging signal, a wireless communication signal, and/or the like. For example, a wireless charging signal may relate to an inductive charging signal, an electric field charging signal, and/or the like. A wireless communication signal, for example, may relate to a near field communication signal, an inductive communication signal, an electric field communication signal, a Bluetooth communication signal, an infrared communication signal, a wireless local area network communication signal, and/or the like. In at least one example embodiment, a wired connection may relate to a physical connection between an apparatus and a separate apparatus via a metallic conductor connection, a fiber optic connection, a cable connection, a dock connection, and/or the like. For example, in one or more example embodiments, a charge session initiation event may relate to establishment of a connection between the apparatus and the separate apparatus, the connection relating to communication associated with the charging of the separate apparatus by the apparatus.

In one or more example embodiments, a charge event may relate to the performance of a charging operation. In one or more example embodiments, a charge session relates to an interactive session between a charger apparatus and a separate apparatus associated with performance of a charging operation. For example, an interactive session between the charger apparatus and the separate apparatus may be associated with communication between the apparatus and the separate apparatus that may relate to the performance of a charging operation. In at least one example embodiment, a charging operation relates to provision of power from the charger apparatus to the separate apparatus. For example, provision of power may relate to the charger apparatus effecting the charging of a separate apparatus. Such a charging of a separate apparatus, for example, may be via inductive charging, electronic field charging, wired charging, and/or the like. One or more example embodiments may further perform a charging operation. In at least one example embodiment, a charging operation relates an initiation of provision of power from the apparatus to the separate apparatus, a modification of provision of power from the apparatus to the separate apparatus, a termination of provision of power from the apparatus to the separate apparatus, and/or the like. For example, initiation of provision of power may relate to transitioning from a state where no power is being provided to a state where power is being provided. Modification of provision of power, for example, may relate to the adjustment of charge voltage, charge amperage, charge time, charge progression, and/or the like, and may relate to physical and/or chemical properties of a separate apparatus power source, power source temperature, power source capacity, power source charge level, and/or the like. Termination of provision of power, for example, may relate to the discontinuation of the provision of power between an apparatus and a separate apparatus. In at least one example embodiment, a charge session event may be independent of a charge event.

Figure 3A:
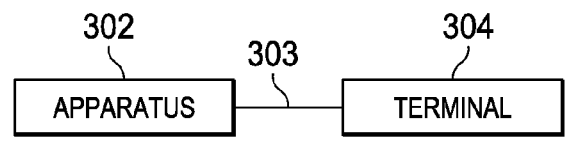
FIGS. 3A-3C are block diagrams illustrating apparatus communication according to at least one example embodiment.
Figure 3B:
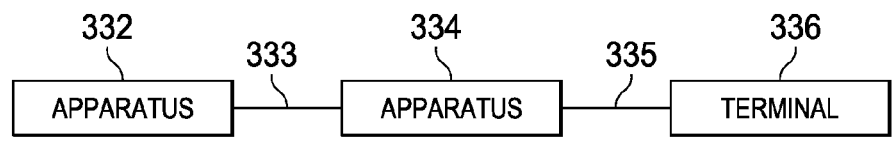
Figure 3C:
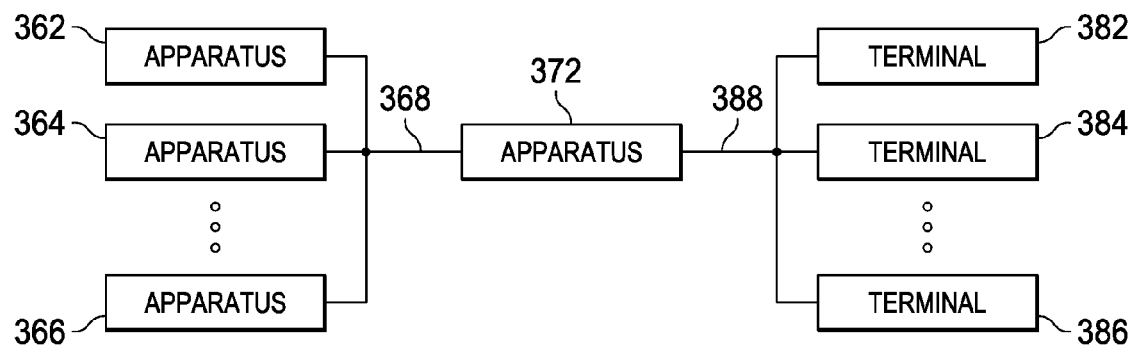

FIGS. 3A-3C are block diagrams illustrating apparatus communication according to at least one example embodiment. The examples of FIGS. 3A-3C are merely examples and do not limit the scope of the claims. For example, connections between various apparatuses may vary, apparatus numbers and locations may vary, the number of intermediate apparatuses may vary, and/or the like.

In one or more example embodiments, a charger apparatus causes a performance of a non-charging operation. For example, in at least one example embodiment, the charger apparatus causes performance of the activity on a separate apparatus, such as a charging apparatus. Causing performance of the activity on the separate apparatus may comprise sending information to the separate apparatus, sending information to a different apparatus, and/or the like.

In certain circumstances, it may be desirable for a charger apparatus to perform specific operations associated with a separate apparatus. For example, performance of the specific operations may be based, at least in part, on the presence of or occurrence of certain circumstances which may be associated with a separate apparatus. In addition to charging operations, it may be desirable for the charger apparatus to perform certain non-charging operations associated with the separate apparatus. Such non-charging operations may be desirable for reasons that may relate to, for example, ease of use of the charger apparatus or the separate apparatus, aiding in communication between the charger apparatus and the separate, and/or the like.

In at least one example embodiment, a non-charging operation may relate to causing sending of a message, a notification, and/or the like between an apparatus and a separate apparatus. For example, a charger apparatus causing sending of a message may relate to the charger apparatus sending a message, the charger apparatus causing a different apparatus to send a message, and/or the like. For example, causing sending of the message may comprise sending a directive to the other apparatus to cause the other apparatus to send the message.

In at least one embodiment, a notification relates to information indicative of at least one of the non-charging operation, the charge session event, the charge session, or the separate apparatus identity. For example, a charger apparatus may cause the sending of a notification to a separate apparatus or a different apparatus. Such a notification may relate to a specific non-charging operation, a charge session event, a charge session, and/or the like. Such a notification may be based, at least in part on, the non-charging operation, the charge session event, the charge session, a separate apparatus identity, a different apparatus identity, and/or the like.

In certain circumstances, it may be desirable to base the non-charging operation on particular conditions. For example, it may be desirable to select and perform a specific non-charging operation based on a particular separate apparatus identity and a specific charge session event. In at least one example embodiment, the apparatus determines a non-charging operation based, at least in part, on the separate apparatus identity and the charge session event. In one or more example embodiments, determination of the non-charging operation is based, at least in part, on the existence of at least one rule associated with the separate apparatus identity and the charge session event, and the non-charging operation is identified by the rule. In at least one example embodiment, a rule identifies a non-charging operation to perform based on the correspondence of a rule separate apparatus identity and a rule charge session event to a particular separate apparatus identity and charge session event. In at least one example embodiment, a rule may be associated with information that identifies a rule charge session event and information that identifies a rule apparatus identity. For example a rule charge session event may designate a charge session event associated with causation of performance of the rule, and/or the like. Additionally, for example, in one or more example embodiments, a rule apparatus identity may designate an apparatus identity associated with causation of performance of the rule.

In certain circumstances, it may be desirable for multiple rules to be organized into a rule list. In one or more example embodiments, determination of existence of a rule may relate to selection of at least one rule from a rule list based, at least in part, on correlation between a separate apparatus identity and a rule apparatus identity of the rule and on correlation between a charge session event and an a rule charge session event of the rule. A rule list, for example, may include information indicative of one or more rules. In at least one example embodiment, a rule apparatus identity is comprised by a rule apparatus identity list, and correlation between the rule apparatus identity and a separate apparatus identity relates to determination that the rule apparatus identity corresponds to the separate apparatus identity. In one or more example embodiments, a rule designates correspondence between any rule apparatus identity of a rule apparatus identity list and a separate apparatus identity as a criteria for performance of a non-charging operation. In one or more example embodiments, a rule designates lack of correspondence between any rule apparatus identity of a rule apparatus identity list and a separate apparatus identity as a criteria for performance of a non-charging operation. For example, it may be desirable to determine that a specific separate apparatus identity corresponds with a rule apparatus identity of a rule in a rule list. Additionally, for example, it may be desirable to determine that a specific separate apparatus identity fails to correspond with a rule apparatus identity of any rule in a rule list. In one or more example embodiments, a rule apparatus identity is comprised by a rule apparatus identity list, and correlation between the rule apparatus identity and the separate apparatus identity relates to determination that each rule apparatus identity of the rule apparatus identity list fails to correspond to the separate apparatus identity. For example, it may be desirable to determine that a specific separate apparatus identity is not designated by and does not correspond with a rule apparatus identity of any rule in a rule list. In at least one example embodiment, a rule apparatus identity list is associated with a rule. In one or more example embodiments, a rule apparatus identity list is associated with a rule list.

In specific circumstances, it may be desirable for a rule to designate a non-charging operation associated with the sending of a message. In at least one example embodiment, a message relates to predetermined information. For example, the text of a message to be sent upon performance of a non-charging operation may be predetermined and designated by a rule. In another example, a recipient of the message may be may be predetermined and designated by the rule.

In certain circumstances, it may be desirable for a rule to cause performance of a non-charging operation upon the first occurrence of rule conditions and to avoid performance of the non-charging operation upon subsequent occurrences of the rule conditions. For example, it may be desirable for a rule associated with a rule separate apparatus identity and a rule charge session event to effect performance of an associated non-charging operation only upon the first meeting of the rule separate apparatus identity and the rule charge session event conditions. In at least one example embodiment, a rule may be associated with a single performance directive. In at least one example embodiment, a directive may relate to a command, an indication, and/or the like that directs the charger apparatus or a separate apparatus to perform a non-charging operation or, in the case of a single performance directive, to avoid performance of a non-charging operation after the first performance of the non-charging operation. In at least one example embodiment, the charger apparatus sends information indicative of the directive to the separate apparatus to cause the separate apparatus to perform the non-charging operation. In circumstances where the non-charging operation relates to sending a message between the charger apparatus and a separate apparatus, the charger apparatus may determine a message directive to instruct the separate apparatus to create a message on the separate apparatus. Based on a single performance directive associated with a rule, one or more example embodiments further perform preclusion of further performance of a non-charging operation based, at least in part, on the rule and the single performance directive. For example, preclusion or further performance may relate to precluding performance after a first performance of a non-charging operation and/or a charging operation, after some predetermined number of performances of the non-charging operation and/or the charging operation, and/or the like.

For example, in certain circumstances, it may be desirable to send a message only upon the first occurrence of rule conditions. This first occurrence message may be desirable for purposes of enabling the leaving of a message relevant to an apparatus and the apparatus' user at a specific time, the leaving of an event specific reminder message, and/or the like. For example, upon the first occurrence of rule conditions that set forth a separate apparatus identity as a rule separate apparatus identity and a charge session event as a rule charge session event, a rule may designate a charger apparatus to cause sending of a reminder message associated with a chronologically proximate meeting to the separate apparatus. It may be desirable to avoid sending subsequent reminder messages upon subsequent charge session initiation events between the charger apparatus and the separate apparatus. As such, it may be desirable to associate a rule with a single performance directive that avoids further performance once a predetermined performance threshold has been reached. For example, a husband may generate a rule to send a message to his wife when his wife connects her apparatus to a charger apparatus. In such circumstances, the husband may desire to avoid having the message repeated each time his wife connects her apparatus to the charger apparatus. In such circumstances, the rule may comprise a single performance directive to avoid repeating the message when the wife reconnects her apparatus to the charger apparatus.

In certain circumstances, it may be desirable to restrict the performance of certain non-charging operations and charging operations. For example, it may be desirable to restrict the initiation of a charging event to separate apparatus identities that correspond to at least one rule separate apparatus identity. Further, it may be desirable to restrict the initiation of a charging event based, at least in part, on lack of recognition and/or lack of receipt of information indicative of a separate apparatus identity. In at least one example embodiment, a non-charging operation relates to an authentication operation. In one or more example embodiments, performance of the charging operation is based upon affirmative authentication of the authentication operation. An authentication operation, for example, may relate to a non-charging operation associated with authenticating an unknown or unidentified separate apparatus in order to enable or initiate another operation, such as another non-charging operation or a charging operation. In at least one example embodiment, an affirmative authentication relates to verifying at least one authentication credential. In one or more example embodiments, an authentication credential may relate to a password, a personal identification number, a code, a unique identifier, a pass phrase, a separate apparatus identity, and/or the like.

For example, in certain circumstances, it may be desirable for a charger apparatus to avoid charging of an unknown or an unauthenticated apparatus. For example, such avoidance may be desirable for purposes relating to reservation of charger apparatuses for predetermined apparatuses, ensuring charger apparatus availability for select apparatuses, preventing excess electricity usage by unknown or unauthorized apparatuses, and/or the like. In at least one example embodiment, a charger apparatus may cause performance of an authentication operation. The authentication operation may, for example, prompt the user of an apparatus attempting to connect to the charger apparatus for a password. In at least one example embodiment, affirmative authentication of the authentication operation by way of entering a correct password may enable performance of a charging operation. In at least one example embodiment, negative authentication of the authentication operation by way of entering an incorrect password may avoid performance of a charging operation. Negative authentication of an authentication operation may relate to the absence of affirmative authentication of the authentication operation.

In certain circumstances, it may be desirable to manage a rule associated with a charger apparatus. In facilitating the management and/or communication of a rule associated with a charger apparatus, information indicative of such a rule may be communicated to the charger apparatus. In one or more example embodiments, the charger apparatus further receives information indicative of a rule from a different separate apparatus. The different separate apparatus may, for example, relate to a rule management server apparatus, a charging apparatus, a rule management client apparatus, and/or the like. In some circumstances, it may be desirable to communicate more than one rule to a charger apparatus. In at least one example embodiment, the charger apparatus further receives information indicative of a rule list from the different separate apparatus. In at least one example embodiment, rules are managed by way of a rule management terminal. A rule management terminal may, for example, relate to a rule management software, a rule management website, a rule management application, and/or the like. A rule management terminal may be associated with a charger apparatus, a separate apparatus, a different separate apparatus, another electronic apparatus such as a computer, and/or the like. In at least one example embodiment, a rule management terminal relates to a textual user interface, a graphical user interface, a command line user interface, and/or the like. For example, in order to generate a rule to send a message to his wife when his wife connects her apparatus to a charger apparatus, a husband may access a rule management terminal by way of a web browser running on a different separate apparatus. In such circumstances, the husband may desire to create and/or manage a rule, by way of a web browser, that designates his wife's apparatus identity as a rule apparatus identity, his wife's charger apparatus identity as a rule apparatus identity, a charge session initiation event as the rule charge session event, and a message operation as the rule's non-charging operation. In such circumstances, the husband may associate the rule with a single performance directive, by way of the web browser, to avoid repeating the message when the wife reconnects her apparatus to the charger apparatus.

FIG. 3A is a diagram illustrating apparatus communication according to at least one example embodiment. In the example of FIG. 3A, apparatus 302 relates to a charger apparatus. In the example of FIG. 3A, terminal 304 relates to a rule management terminal. Charger apparatus 302 and terminal 304 may communicate with each other, such as by way of communication channel 303. In the example of FIG. 3A, communication channel 303 may relate to proximity-based communication, short range communication, wireless local area network communication, local area network communication, internet communication, and/or the like.

FIG. 3B is a diagram illustrating apparatus communication according to at least one example embodiment. In FIG. 3B, apparatus 332, terminal 336, communication channel 333, and communication channel 335 may be similar as described regarding FIG. 3A. In at least one example embodiment, apparatus 332 relates to a charger apparatus. In one or more example embodiments, terminal 336 relates to a rule management terminal. In the example of FIG. 3B, charger apparatus 332 and terminal 336 may communicate with each other, such as by way of intermediate apparatus 334 by way of communication channel 333 and communication channel 335. For example, a user may manage a rule via terminal 336, which communicates said rule to intermediate apparatus 334 by way of communication channel 335, said intermediate apparatus 334 in turn communicating said rule to charger apparatus 332 by way of communication channel 334. In one or more example embodiments, intermediate apparatus 334 relates to a different separate apparatus. In the example of FIG. 3B, communication channel 333 and communication channel 335 may relate to proximity-based communication, short range communication, wireless local area network communication, local area network communication, internet communication, and/or the like.

FIG. 3C is a diagram illustrating apparatus communication according to at least one example embodiment. In FIG. 3C, the apparatuses, intermediate apparatus, and terminals may be similar as described regarding FIGS. 3A and 3B. In the example of FIG. 3C, a plurality of apparatuses—charger apparatus 362, charger apparatus 364, and charger apparatus 366—are shown to be in communication with intermediate apparatus 372 by way of communication channel 368. In the example of FIG. 3C, a plurality of terminals—terminal 382, terminal 384, and terminal 386—are shown to be in communication with intermediate apparatus 372 by way of communication channel 388. In the example of FIG. 3C, charger apparatus 362, charger apparatus 364, and charger apparatus 366 may communicate with terminal 382, terminal 384, and terminal 386, such as by way of intermediate apparatus 372 by way of communication channel 368 and communication channel 388. For example, a user may manage a rule via terminal 382, which communicates said rule to intermediate apparatus 372 by way of communication channel 388, said intermediate apparatus 372 in turn communicating said rule to at least one of charger apparatus 362, charger apparatus 364, or charger apparatus 366 by way of communication channel 368. In at least one example embodiment, intermediate apparatus 372 selectively communicates a rule with one or more charger apparatus based, at least in part, on the rule apparatus identity associated with said rule. In one or more example embodiments, intermediate apparatus 372 relates to a rule management server apparatus, a charging apparatus, a rule management client apparatus, and/or the like. In the example of FIG. 3C, communication channel 368 and communication channel 388 may relate to proximity-based communication, short range communication, wireless local area network communication, local area network communication, internet communication, and/or the like.

Figure 4A:
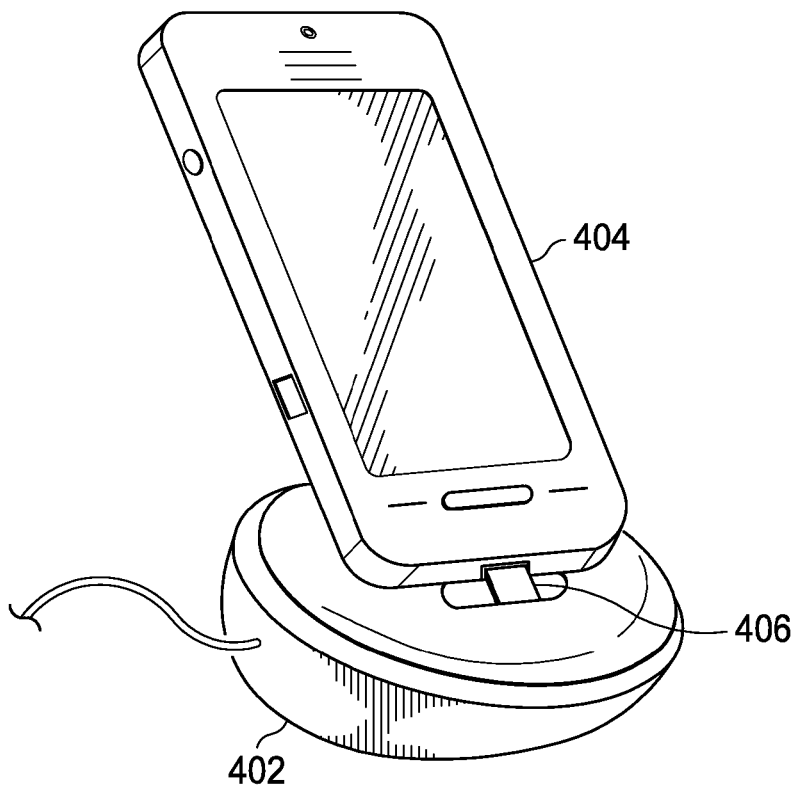
FIGS. 4A-4B are illustrations showing apparatus communication and apparatus charging according to at least one example embodiment.
Figure 4B:
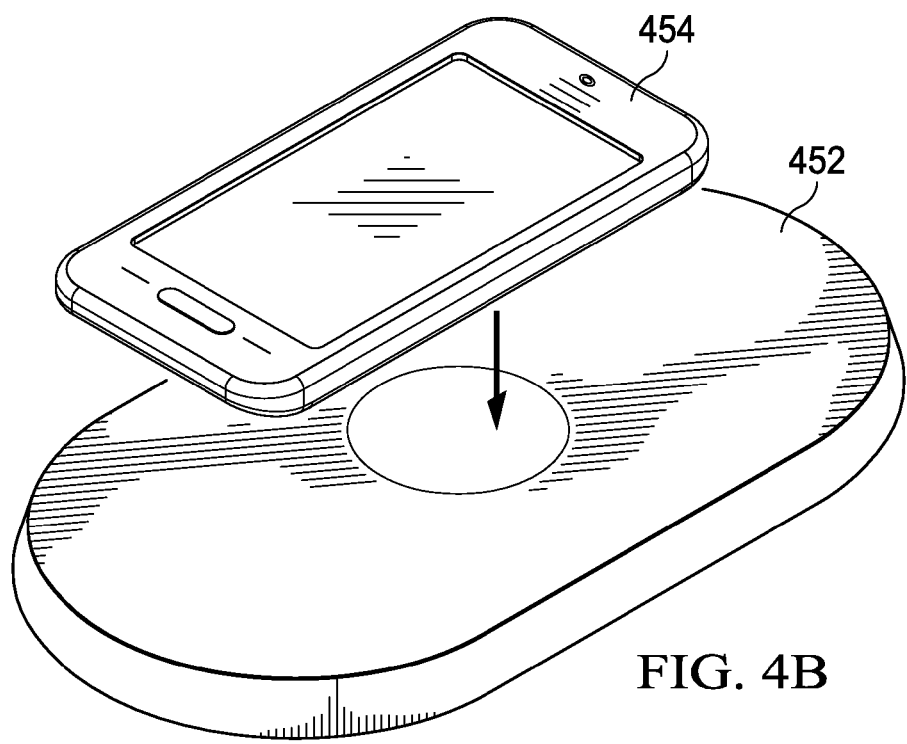

FIGS. 4A-4B are illustrations showing apparatus communication and apparatus charging according to at least one example embodiment. The examples of FIGS. 4A-4B are merely examples and do not limit the scope of the claims. For example, physical appear may vary, physical design may vary, communication methods may vary, and/or the like.

In certain circumstances, it may be desirable to charge an apparatus after extended use of said apparatus by way of a charger apparatus. A charger apparatus may relate to, for example, a power supply unit, a dock apparatus, and/or the like. In one or more example embodiments, provision of power from the charger apparatus to the apparatus is effected by way of a connection between the apparatus and the charger apparatus. In at least one example embodiment, a connection between a charger apparatus and an apparatus relates to a wireless connection, a wired connection, and/or the like. For example, a wireless connection may relate to inductive charging, electronic field charging, and/or the like. A wired connection, for example, may relate to a cable connection, a dock connection, and/or the like.

In at least one example embodiment, a charger apparatus relates to an apparatus associated with providing power to an apparatus. The charger apparatus may be a specialized apparatus designed for performance of charging. For example, the charger apparatus may lack user interaction devices, such as a display, a touch sensor, a keypad, and/or the like. In such an example, the charger apparatus may comprise sensors associated with detection of an apparatus to be charged absent such user interaction devices.

FIG. 4A is an illustration showing wired apparatus communication and/or charging according to at least one example embodiment. In the example of FIG. 4A, charger apparatus 402 and apparatus 404 are connected by way of wired connection 406. In at least one example embodiment, apparatus 404 relates to a charging apparatus. In at least one example embodiment, a charging apparatus relates to an apparatus that is connected with a charger apparatus in a manner that allows for performance of charging. Wired connection 406 may relate to a dock connection, as illustrated in FIG. 4A, or may relate to a cable connection, physical connection, and/or the like. In one or more example embodiments, wired connection 406 relates to the provision of power from charger apparatus 402 to apparatus 404. In FIG. 4A, charger apparatus 402, apparatus 404, and wired connection 406 may be similar as described regarding FIG. 2.

FIG. 4B is an illustration showing wireless apparatus communication and/or charging according to at least one example embodiment. In the example of FIG. 4B, charger apparatus 452 and apparatus 454 are connected by way of a wireless connection. In at least one example embodiment, apparatus 454 relates to a charging apparatus. In one or more example embodiments, a wireless connection between charger apparatus 452 and apparatus 454 relates to the provision of power from charger apparatus 452 to apparatus 454. In FIG. 4B, charger apparatus 452, apparatus 454, and a wireless connection between charger apparatus 452 and apparatus 454 may be similar as described regarding FIG. 2.

Figure 5:
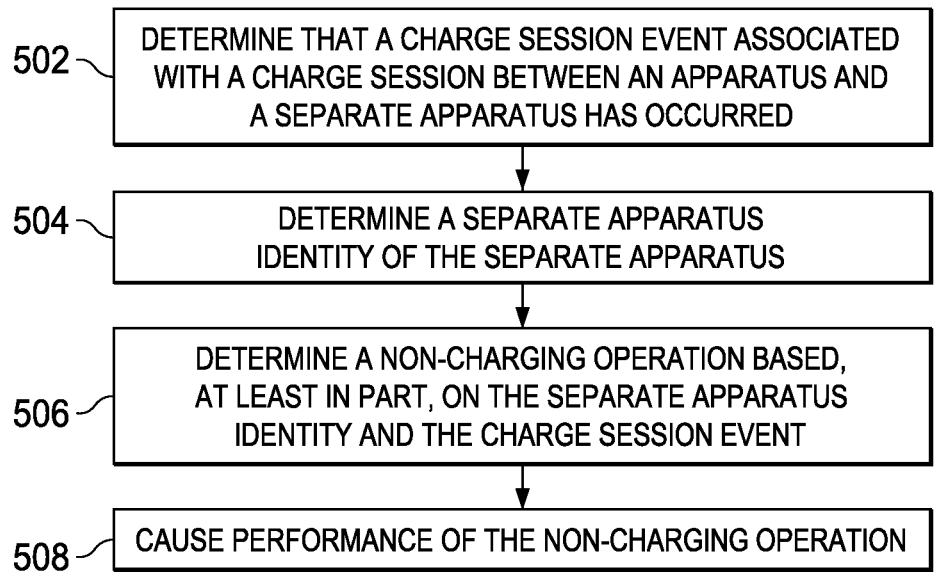
FIG. 5 is a flow diagram illustrating activities associated with determination of a non-charging operation according to at least one example embodiment.

FIG. 5 is a flow diagram illustrating activities associated with determination of a non-charging operation according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus determines that a charge session event associated with a charge session between the apparatus and a separate apparatus has occurred. The determination, the charge session event, and the separate apparatus may be similar as described regarding FIG. 2.

At block 504, the apparatus determines a separate apparatus identity of the separate apparatus. The determination, the separate apparatus, and the separate apparatus identity may be similar as described regarding FIG. 2. In this manner, determination of a separate apparatus identity of a separate apparatus may be based, at least in part, on an occurrence of a charge session event associated with a charge session between an apparatus and the separate apparatus. For example, determination of a separate apparatus identity of a separate apparatus may be caused, at least in part, by the occurrence of a charge session event. In another example, determination of a separate apparatus identity of a separate apparatus may be predicated, at least in part, by the occurrence of a charge session event.

At block 506, the apparatus determines a non-charging operation based, at least in part, on the separate apparatus identity and the charge session event. The determination of the non-charging operation may be similar as described regarding FIG. 3.

At block 508, the apparatus causes performance of the non-charging operation. The causation of the performance of the non-charging operation may be similar as described regarding FIG. 3. In this manner, causation of the performance of the non-charging operation may be based, at least in part, on the determination of a non-charging operation. For example, causation of the performance of the non-charging operation may be caused, at least in part, by the determination of a non-charging operation. In another example, causation of the performance of the non-charging operation may be predicated, at least in part, by the determination of a non-charging operation.

Figure 6:
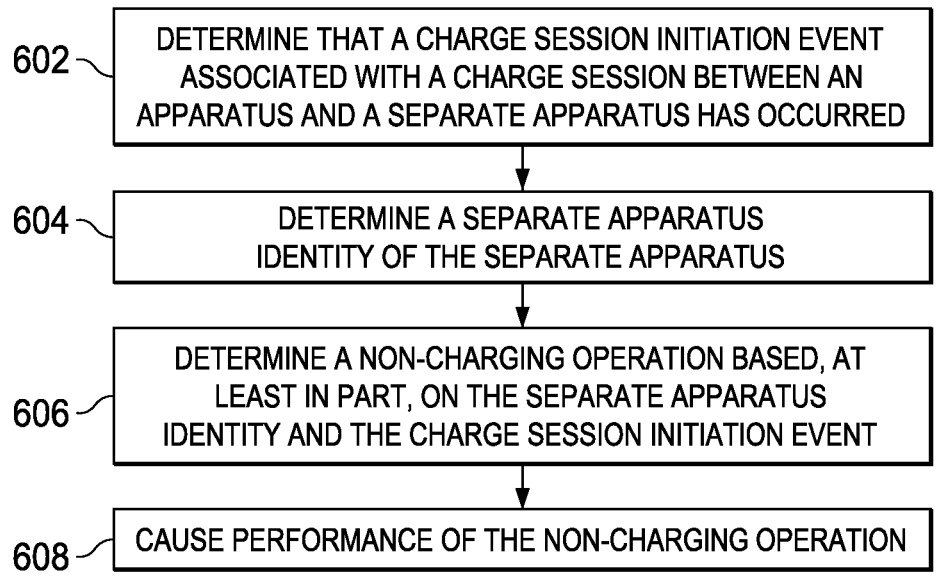
FIG. 6 is a flow diagram illustrating activities associated with determination of a non-charging operation according to at least one example embodiment.

FIG. 6 is a flow diagram illustrating activities associated with determination of a non-charging operation according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus determines that a charge session initiation event associated with a charge session between an apparatus and a separate apparatus has occurred. The determination, the charge session initiation event, and the separate apparatus may be similar as described regarding FIG. 2.

At block 604, the apparatus determines a separate apparatus identity of the separate apparatus, similarly as described regarding block 504 of FIG. 5.

At block 606, the apparatus determines a non-charging operation based, at least in part, on the separate apparatus identity and the charge session initiation event. The determination and the non-charging operation may be similar as described regarding FIG. 3.

At block 608, the apparatus causes performance of the non-charging operation, similarly as described regarding block 508 of FIG. 5.

Figure 7:
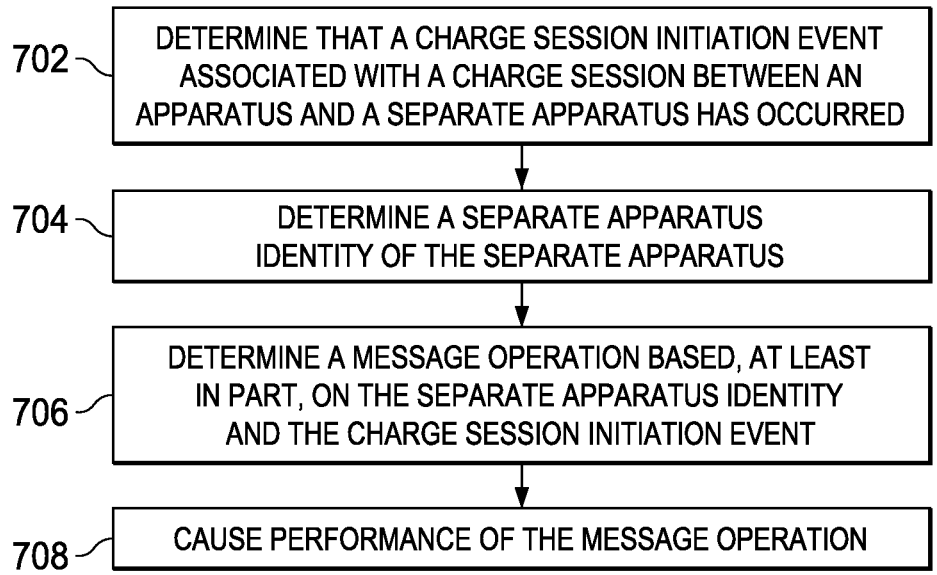
FIG. 7 is a flow diagram illustrating activities associated with determination of a non-charging operation according to at least one example embodiment.

FIG. 7 is a flow diagram illustrating activities associated with determination of a non-charging operation according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines that a charge session initiation event associated with a charge session between an apparatus and a separate apparatus has occurred, similarly as described regarding block 602 of FIG. 6.

At block 704, the apparatus determines a separate apparatus identity of the separate apparatus, similarly as described regarding block 504 of FIG. 5

At block 706, the apparatus determines a message operation based, at least in part, on the separate apparatus identity and the charge session initiation event. The determination and the message operation may be similar as described regarding FIG. 3.

At block 708, the apparatus causes performance of the message operation. The causation of the performance of the message operation may be similar as described regarding FIG. 3. In this manner, causation of the performance of the message operation may be based, at least in part, on the determination of a message operation. For example, causation of the performance of the message operation may be caused, at least in part, by the determination of a message operation. In another example, causation of the performance of the message operation may be predicated, at least in part, by the determination of a message operation.

Figure 8:
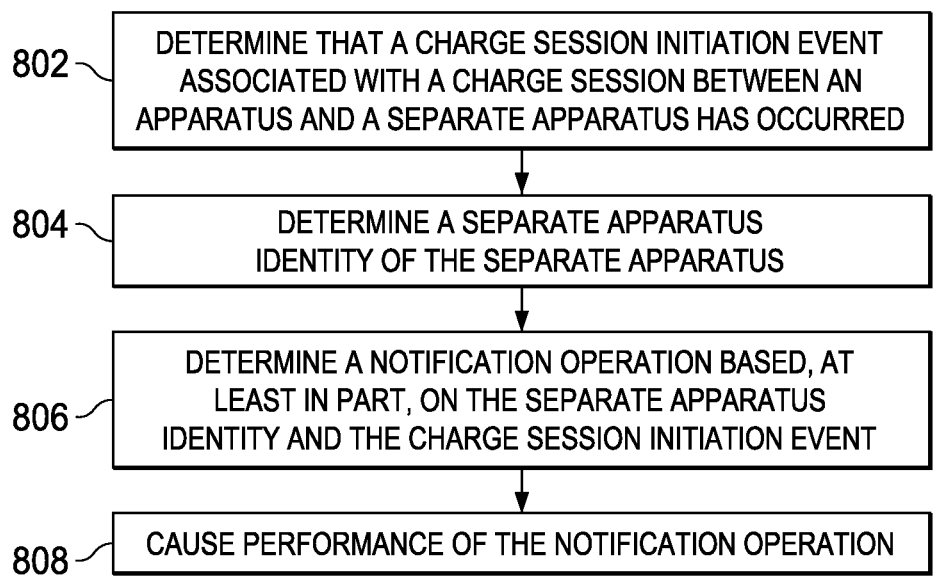
FIG. 8 is a flow diagram illustrating activities associated with determination of a non-charging operation according to at least one example embodiment.

FIG. 8 is a flow diagram illustrating activities associated with determination of a non-charging operation according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus determines that a charge session initiation event associated with a charge session between an apparatus and a separate apparatus has occurred, similarly as described regarding block 502 of FIG. 5.

At block 804, the apparatus determines a separate apparatus identity of the separate apparatus, similarly as described regarding block 504 of FIG. 5.

At block 806, the apparatus determines a notification operation based, at least in part, on the separate apparatus identity and the charge session initiation event. The determination and the notification operation may be similar as described regarding FIG. 3.

At block 808, the apparatus causes performance of the notification operation. The causation of the performance of the notification operation may be similar as described regarding FIG. 3. In this manner, causation of the performance of the notification operation may be based, at least in part, on the determination of a notification operation. For example, causation of the performance of the notification operation may be caused, at least in part, by the determination of a notification operation. In another example, causation of the performance of the notification operation may be predicated, at least in part, by the determination of a notification operation.

Figure 9:
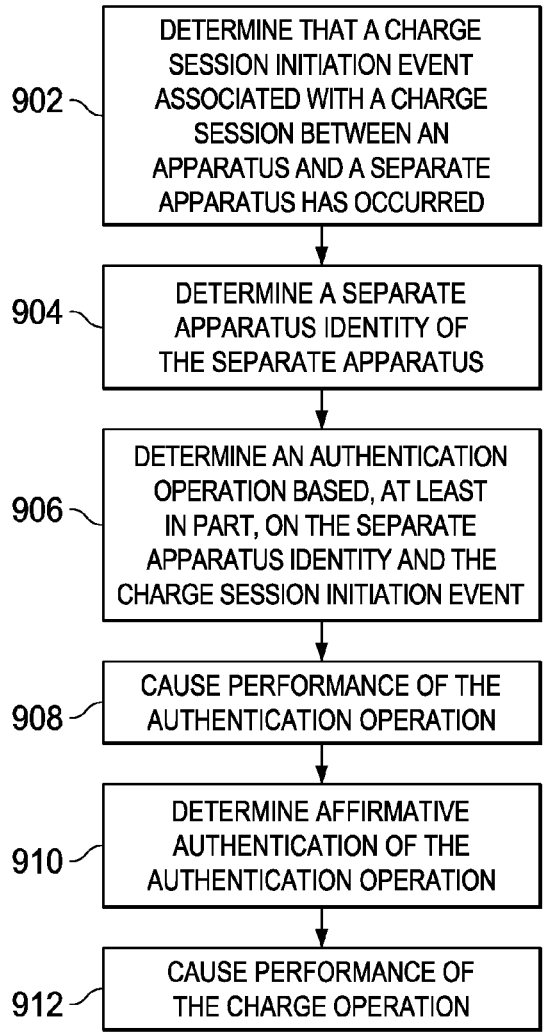
FIG. 9 is a flow diagram illustrating activities associated with determination of a non-charging operation according to at least one example embodiment.

FIG. 9 is a flow diagram illustrating activities associated with determination of a non-charging operation according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus determines that a charge session initiation event associated with a charge session between an apparatus and a separate apparatus has occurred, similarly as described regarding block 502 of FIG. 5.

At block 904, the apparatus determines a separate apparatus identity of the separate apparatus, similarly as described regarding block 504 of FIG. 5.

At block 906, the apparatus determines an authentication operation based, at least in part, on the separate apparatus identity and the charge session initiation event. The determination and the authentication operation may be similar as described regarding FIG. 3.

At block 908, the apparatus causes performance of the authentication operation. The causation of the performance of the authentication operation may be similar as described regarding FIG. 3. In this manner, causation of the performance of the authentication operation may be based, at least in part, on the determination of an authentication operation. For example, causation of the performance of the authentication operation may be caused, at least in part, by the determination of an authentication operation. In another example, causation of the performance of the authentication operation may be predicated, at least in part, by the determination of an authentication operation.

At block 910, the apparatus determines affirmative authentication of the authentication operation. The determination, the affirmative authentication, and the authentication operation may be similar as described regarding FIG. 3. In this manner, determination of affirmative authentication may be based, at least in part, on the performance of an authentication operation. For example, affirmative authentication may be caused, at least in part, by the performance of an authentication operation. In another example, determination of affirmative authentication may be predicated, at least in part, by the performance of an authentication operation.

At block 912, the apparatus causes performance of the charge operation. The causation of the performance of the charge operation may be similar as described regarding FIG. 2 and FIG. 3.

Figure 10:
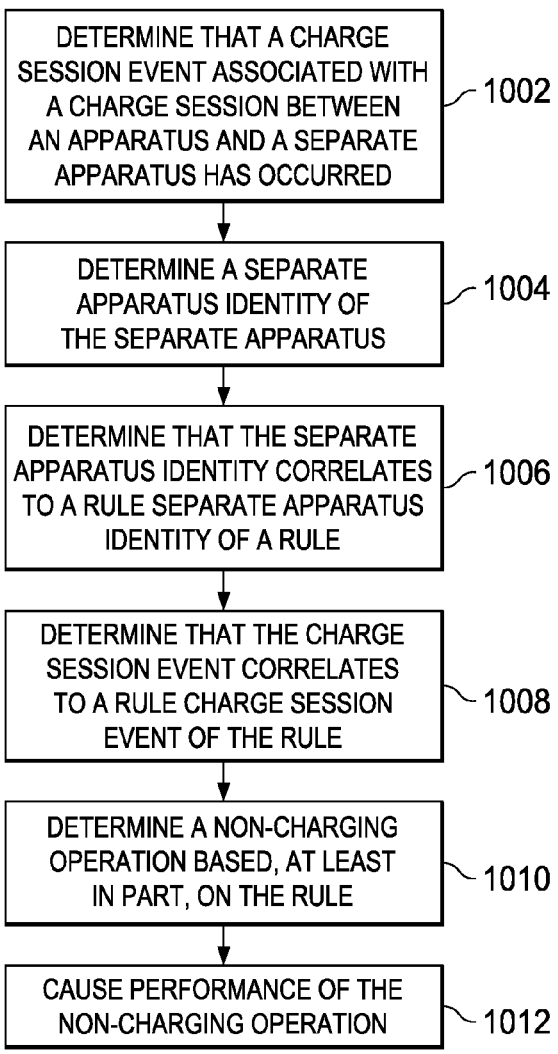
FIG. 10 is a flow diagram illustrating activities associated with determination of a non-charging operation according to at least one example embodiment.

FIG. 10 is a flow diagram illustrating activities associated with determination of a non-charging operation according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus determines that a charge session event associated with a charge session between an apparatus and a separate apparatus has occurred, similarly as described regarding block 502 of FIG. 5.

At block 1004, the apparatus determines a separate apparatus identity of the separate apparatus, similarly as described regarding block 504 of FIG. 5.

At block 1006, the apparatus determines that the separate apparatus identity correlates to a rule separate apparatus identity of a rule. The determination, the rule separate apparatus identity, the rule, and the correlation may be similar as described regarding FIG. 3. In this manner, determination of the correlation between the separate apparatus identity and the rule separate apparatus identity may be based, at least in part, on the determination of a separate apparatus identity. For example, determination of the correlation between the separate apparatus identity and the rule separate apparatus identity may be caused, at least in part, by the determination of a separate apparatus identity. In another example, determination of the correlation between the separate apparatus identity and the rule separate apparatus identity may be predicated, at least in part, by the determination of a separate apparatus identity.

At block 1008, the apparatus determines that the charge session event correlates to a rule charge session event of the rule. The determination, the rule charge session event, and the correlation may be similar as described regarding FIG. 3. In this manner, determination of the correlation between the charge session event and the rule charge session event may be based, at least in part, on the determination of correlation between the separate apparatus identity and the rule separate apparatus identity. For example, determination of the correlation between the charge session event and the rule charge session event may be caused, at least in part, by the determination of correlation between the separate apparatus identity and the rule separate apparatus identity. In another example, determination of the correlation between the charge session event and the rule charge session event may be predicated, at least in part, by the determination of correlation between the separate apparatus identity and the rule separate apparatus identity.

At block 1010, the apparatus determines a non-charging operation based, at least in part, on the rule. The determination and the non-charging operation may be similar as described regarding FIG. 3. In this manner, determination of the non-charging operation may be based, at least in part, on the determination of correlation or lack of correlation between the separate apparatus identity and the rule separate apparatus identity and the determination of correlation or lack of correlation between the charge session event and the rule charge session event. For example, determination of the non-charging operation may be caused, at least in part, by the determination of correlation or lack of correlation between the separate apparatus identity and the rule separate apparatus identity and the determination of correlation or lack of correlation between the charge session event and the rule charge session event. In another example, determination of the non-charging operation may be predicated, at least in part, by the determination of correlation or lack of correlation between the separate apparatus identity and the rule separate apparatus identity and the determination of correlation or lack of correlation between the charge session event and the rule charge session event.

At block 1012, the apparatus causes performance of the non-charging operation, similarly as described regarding block 508 of FIG. 5.

Figure 11:
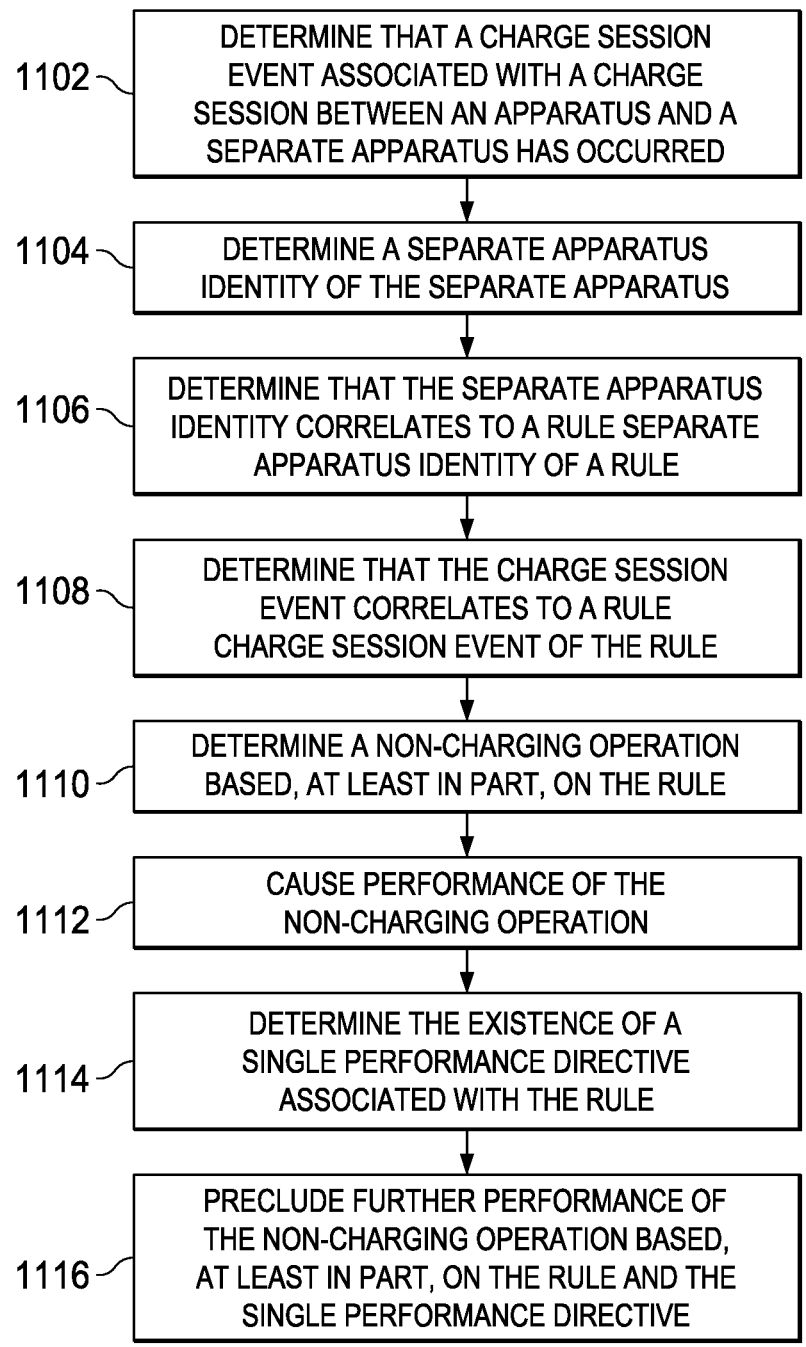
FIG. 11 is a flow diagram illustrating activities associated with determination of a non-charging operation according to at least one example embodiment.

FIG. 11 is a flow diagram illustrating activities associated with determination of a non-charging operation according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus determines that a charge session event associated with a charge session between an apparatus and a separate apparatus has occurred, similarly as described regarding block 502 of FIG. 5.

At block 1104, the apparatus determines a separate apparatus identity of the separate apparatus, similarly as described regarding block 504 of FIG. 5.

At block 1106, the apparatus determines that the separate apparatus identity correlates to a rule separate apparatus identity of a rule, similarly as described regarding block 1006 of FIG. 10.

At block 1108, the apparatus determines that the charge session event correlates to a rule charge session event of the rule, similarly as described regarding block 1008 of FIG. 10.

At block 1110, the apparatus determines a non-charging operation based, at least in part, on the rule, similarly as described regarding block 1010 of FIG. 10.

At block 1112, the apparatus causes performance of the non-charging operation, similarly as described regarding block 508 of FIG. 5.

At block 1114, the apparatus determines the existence of a single performance directive associates with the rule. The determination, the existence, the single performance directive, and the rule may be similar as described regarding FIG. 3. In this manner, determination of the existence of a single performance directive may be based, at least in part, on the performance of the non-charging operation. For example, determination of the existence of a single performance directive may be caused, at least in part, by the performance of the non-charging operation. In another example, determination of the existence of a single performance directive may be predicated, at least in part, by the performance of the non-charging operation.

At block 1116, the apparatus precludes further performance of the non-charging operation based, at least in part, on the rule and the single performance directive. The preclusion of further performance, the non-charging operation, the rule, and the single performance directive may be similar as described regarding FIG. 3. In this manner, preclusion of further performance of the non-charging operation may be based, at least in part, on the determination of the existence of a single performance directive associated with the rule. For example, preclusion of further performance of the non-charging operation may be caused, at least in part, by the determination of the existence of a single performance directive associated with the rule. In another example, preclusion of further performance of the non-charging operation may be predicated, at least in part, by the determination of the existence of a single performance directive associated with the rule.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1006 of FIG. 10 may be performed after block 1008. Furthermore, if desired, one or more of the above-described functions may be optional or may be combined. For example, block 1106 of FIG. 11 may be optional and/or combined with block 1108 of FIG. 11.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   determine that a charge session has been initiated between the apparatus and a first mobile device;
   receive an identifier of the first mobile device; and
   transmit, based on the identifier, a message to a second mobile device, wherein the message indicates that the charge session was initiated.

2. The apparatus of claim 1, wherein the memory further includes computer program code configured to, working with the processor, cause the apparatus to charge the first mobile device.

3. The apparatus of claim 2, wherein the memory further includes computer program code configured to, working with the processor, cause the apparatus to receive an authentication credential from the first mobile device, and wherein the computer program code configured to cause the apparatus to charge the first mobile device comprises computer program code configured to cause the apparatus to charge the first mobile device in response to verifying the authentication credential.

4. The apparatus of claim 1, wherein the computer program code configured to cause the apparatus to transmit the message to the second mobile device comprises computer program code configured to cause the apparatus to transmit the message to the second mobile device based on a rule associated with the first mobile device.

5. The apparatus of claim 1, wherein the apparatus is configured to recharge one or more devices.

6. The apparatus of claim 1, wherein the identifier of the first mobile device comprises a phone number or an international mobile equipment identity (IMEI) number.

7. The apparatus of claim 1, wherein the memory further includes computer program code configured to, working with the processor, cause the apparatus to determine that the identifier of the first mobile device is equivalent to a stored identifier, and wherein the computer program code configured to cause the apparatus to transmit the message comprises computer program code configured to cause the apparatus to, in response to the determining that the identifier of the first mobile device is equivalent to the stored identifier, transmit the message.

8. A method comprising:
  receiving, at a mobile device that is in communication with a charging apparatus, an indication that a charge session has been initiated between the charging apparatus and a charging device;
  receiving, at the mobile device, an identifier of the charging device;
  receiving, at the mobile device, user input comprising an instruction to terminate charging of the charging device; and
  transmitting, from the mobile device and to the charging apparatus, the instruction.

9. The method of claim 8, further comprising charging, by the charging apparatus, the mobile device.

10. The method of claim 8, further comprising transmitting, from the mobile device to the charging apparatus an authentication credential.

11. The method of claim 8, wherein transmitting the instruction to the charging apparatus comprises transmitting a rule to the charging apparatus.

12. The method of claim 8, further comprising sending at least one of a message or a notification, wherein the message or the notification comprises an indication that the charge session has been initiated between the charging apparatus and the charging device.

13. The method of claim 8, wherein the charging device is the mobile device.

14. The method of claim 8, further comprising displaying, at the mobile device, the identifier of the charging device.

15. The method of claim 8, further comprising terminating, by the charging apparatus, the charge session between the charging apparatus and the charging device.

16. At least one non-transitory computer-readable medium encoded with instructions that, when executed by a processor, cause the processor to:
  receive, at a charging apparatus and from a mobile device, a message corresponding to a selected device;
  determine that a charge session has been initiated between the charging apparatus and the selected device;
  receive, at the charging apparatus and from the selected device, an identifier corresponding to the selected device; and
  in response to receiving the identifier, transmit, based on determining that the charge session has been initiated, from the charging apparatus and to the selected device, the message.

17. The non-transitory computer-readable medium of claim 16, wherein the instructions further cause the processor to initiate charging of the selected device.

18. The non-transitory computer-readable medium of claim 16, wherein the instructions further cause the processor to receive, at the charging apparatus and from the mobile device, a rule corresponding to the message, wherein the rule indicates the selected device.

19. The non-transitory computer-readable medium of claim claim 16, wherein the instructions further cause the processor to transmit, in response to the determining that the charge session has been initiated, from the charging apparatus, and to the mobile device a message or a notification.

20. The non-transitory computer-readable medium of claim 16, wherein the selected device is the mobile device.

* * * * *